United States Patent
Klotz

(10) Patent No.: US 9,140,791 B2
(45) Date of Patent: Sep. 22, 2015

(54) METHOD FOR FUNCTIONAL TESTING OF AN ULTRASONIC SENSOR ON A MOTOR VEHICLE, METHOD FOR OPERATING AN ULTRASONIC SENSOR ON A MOTOR VEHICLE, AND DISTANCE MEASURING DEVICE HAVING AT LEAST ONE ULTRASONIC SENSOR FOR USE IN A MOTOR VEHICLE

(75) Inventor: Albrecht Klotz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 982 days.

(21) Appl. No.: 13/318,753

(22) PCT Filed: Apr. 6, 2010

(86) PCT No.: PCT/EP2010/054484
§ 371 (c)(1),
(2), (4) Date: Jan. 18, 2012

(87) PCT Pub. No.: WO2010/130508
PCT Pub. Date: Nov. 18, 2010

(65) Prior Publication Data
US 2012/0106291 A1      May 3, 2012

(30) Foreign Application Priority Data
May 13, 2009 (DE) .......................... 10 2009 003 049

(51) Int. Cl.
*G01S 15/93* (2006.01)
*G01S 7/52* (2006.01)

(52) U.S. Cl.
CPC ........... *G01S 15/931* (2013.01); *G01S 7/52004* (2013.01); *G01S 7/5205* (2013.01); *G01S 2015/938* (2013.01)

(58) Field of Classification Search
CPC ................. G01S 7/52004; G01S 2007/52009; G01S 2007/52012; G01S 2007/52014; G01S 7/59092
See application file for complete search history.

(56) References Cited

U.S. PATENT DOCUMENTS

| 5,339,081 A | * | 8/1994 | Jefferis et al. .................. 342/28 |
| 5,826,216 A | * | 10/1998 | Lyons et al. .................. 702/143 |
| 5,872,536 A | * | 2/1999 | Lyons et al. .................... 342/70 |
| 6,179,780 B1 | * | 1/2001 | Hossack et al. ............... 600/437 |
| 6,225,891 B1 | * | 5/2001 | Lyons et al. .................. 340/435 |

(Continued)

FOREIGN PATENT DOCUMENTS

| CN | 200983008 | 11/2007 |
| CN | 101147083 | 3/2008 |
| CN | 101254115 | 9/2008 |
| CN | 101320088 | 12/2008 |
| CN | 101322044 | 12/2008 |
| DE | 10 2005 013 589 | 9/2006 |
| DE | 10 2005 057 973 | 6/2007 |

OTHER PUBLICATIONS

International Search Report for PCT/EP2010/054484, dated Jul. 7, 2010.

*Primary Examiner* — Ari M Diacou
(74) *Attorney, Agent, or Firm* — Kenyon & Kenyon LLP

(57) ABSTRACT

In a method for functional testing of an ultrasonic sensor on a motor vehicle, the ultrasonic sensor is controlled in such a way that it emits an ultrasonic signal having a frequency of a secondary mode of the ultrasonic sensor, the ultrasonic signal is reflected by a surface in the region around the vehicle, and at least one transmission path or one transmitting unit of the ultrasonic sensor is classified as functional if the reflected signal is received by the ultrasonic sensor itself or by another ultrasonic sensor on the motor vehicle.

11 Claims, 2 Drawing Sheets

(56) References Cited

U.S. PATENT DOCUMENTS

| | | | |
|---|---|---|---|
| 6,337,625 B1* | 1/2002 | Taylor et al. | 340/541 |
| 7,843,764 B2* | 11/2010 | Hongou | 367/13 |
| 7,946,990 B2* | 5/2011 | Srinivasan et al. | 600/454 |
| 8,750,071 B2* | 6/2014 | Frank et al. | 367/13 |
| 2004/0102700 A1* | 5/2004 | Asafusa | 600/437 |
| 2004/0165735 A1 | 8/2004 | Opitz | |
| 2005/0111846 A1* | 5/2005 | Steinbacher et al. | 398/140 |
| 2006/0036169 A1* | 2/2006 | Satoh | 600/437 |
| 2007/0040676 A1* | 2/2007 | Bandringa et al. | 340/567 |

* cited by examiner

METHOD FOR FUNCTIONAL TESTING OF AN ULTRASONIC SENSOR ON A MOTOR VEHICLE, METHOD FOR OPERATING AN ULTRASONIC SENSOR ON A MOTOR VEHICLE, AND DISTANCE MEASURING DEVICE HAVING AT LEAST ONE ULTRASONIC SENSOR FOR USE IN A MOTOR VEHICLE

BACKGROUND OF THE INVENTION

1. Field of the Invention

The present invention describes a method for functional testing of an ultrasonic sensor on a motor vehicle, a method for operating an ultrasonic sensor on a motor vehicle, and a distance measuring device having at least one ultrasonic sensor for use in a motor vehicle.

2. Description of Related Art

Distance measuring devices for motor vehicles which determine the distance from obstructions in the vehicle surroundings with the aid of ultrasonic signals have been known for quite some time. A sensor emits an ultrasonic signal which is reflected by an obstruction. The reflected signal is received by the sensor which has emitted the signal, or optionally by another sensor. The distance of the obstruction from the vehicle is determined based on the propagation time of the signal. Such ultrasonic distance measuring devices are used in particular to assist the driver in parking the vehicle. The uses of the driver assistance system range from outputting a simple warning message regarding a recognized obstruction to automatically controlling the speed as a function of the obstruction situation (park-stop function). Increasingly higher demands are being placed on the availability of the distance measuring device, and thus, of the ultrasonic sensors. It is therefore known to carry out functional testing, frequently also referred to as "blindness testing," for the particular surroundings sensor system, in the form of self-tests. In particular for ultrasonic sensors, a gradual drop in performance may also result due to soiling.

A method is known from the published German patent application document DE 10 2005 057 973 A1 for functional testing of an ultrasonic sensor on a motor vehicle, in which the ultrasonic sensor emits an ultrasonic signal, and the ultrasonic signal is reflected by a ground surface in front of the vehicle and received by the ultrasonic sensor or another ultrasonic sensor. The duration and/or the amplitude of the emitted ultrasonic signal is/are selected to be large enough that reception of the signal that is reflected by the ground surface is made possible under customary conditions, and that functioning of the ultrasonic sensor is confirmed upon receipt of the reflected signal.

In comparison to the intended use of the ultrasonic sensor for distance measurement, also referred to below as "useful mode," the duration and/or the amplitude of the emitted ultrasonic signal is/are accordingly explicitly altered for carrying out the functional testing. As a consequence, however, the functional testing must be carried out in a particular operating mode, referred to below as "test mode," since otherwise, significant interferences and therefore errors would result during the distance measurement. As a result, however, all driver assistance functions which use the ultrasonic sensor are not available during the test mode. For functional testing which is meaningfully carried out before the start of the function, this results in a significant delay in the availability of the driver assistance functions. Since limited functionality or lack of functionality of the ultrasonic sensor may also occur during operation, for example as the result of icing or heavy soiling, functional testing during ongoing operation is also meaningful. However, in the known methods this is possible only during time periods in which the affected driver assistance function does not have to be available. For a classical parking function, this is the case, for example, for vehicle speeds above a speed threshold of 30 km/h. Due to the further functional development of ultrasonic sensors, for example the use for park-stop functions, it is increasingly difficult to find operating conditions, and therefore operating times, in which the driver assistance function, which uses the ultrasonic sensor to be tested, does not have to be available.

BRIEF SUMMARY OF THE INVENTION

The present invention overcomes the above-described problem by providing a method for functional testing of an ultrasonic sensor on a motor vehicle, in which the ultrasonic sensor is controlled in such a way that it emits an ultrasonic signal having a frequency of a secondary mode of the ultrasonic sensor, the ultrasonic signal is reflected by a surface in the region around the vehicle, and at least one transmission path or one transmitting unit of the ultrasonic sensor is classified as functional if the reflected signal is received by the ultrasonic sensor itself or by another ultrasonic sensor on the motor vehicle.

In one specific embodiment of the present invention, the reception path or the receiving unit of this ultrasonic sensor is also classified as functional if the reflected signal is received by the ultrasonic sensor itself which emits the ultrasonic signal. In contrast, if the reflected signal is received by another ultrasonic sensor, the reception path or the receiving unit of this other ultrasonic sensor is classified as functional according to another specific embodiment of the present invention.

The method according to the present invention and the distance measuring device according to the present invention have the advantage that the driver assistance functions which use the ultrasonic sensor are not impaired by the functional testing, and therefore the functional testing may be carried out concurrently with the useful mode of the ultrasonic sensor. Thus, no down times result in which a driver assistance system is not available due to a test mode of the ultrasonic sensors.

The ultrasonic sensor is preferably controlled in such a way that the emitted ultrasonic signal is reflected by a ground surface in the region around the vehicle. The functional testing is thus largely independent of the instantaneous location of the motor vehicle.

It is also advantageous that the ultrasonic sensor is controlled with the aid of a control signal which, in addition to frequency components of the secondary mode of the ultrasonic sensor, also has frequency components of the fundamental mode of the ultrasonic sensor, the frequency components in each case being large enough that the ultrasonic sensor emits an ultrasonic signal having the frequency of the secondary mode as well as an ultrasonic signal having the frequency of the fundamental mode. Concurrent connection of the useful mode and of the test mode of the ultrasonic sensor is thus achieved in real time.

According to one specific embodiment of the present invention, the evaluation of the reflected signal, and thus the classification of the functionality, may be carried out in an evaluation logic system of the receiving ultrasonic sensor itself or in a higher-order control unit.

According to one advantageous specific embodiment of the present invention, the results of the functional testing are transmitted to a control unit in time periods in which no data from the useful mode of the ultrasonic sensor are transmitted. Thus, influencing of the useful mode of the ultrasonic sensor by the functional testing may also be ruled out in the area of signal and/or data transmission.

DETAILED DESCRIPTION OF THE INVENTION

Figure 1:
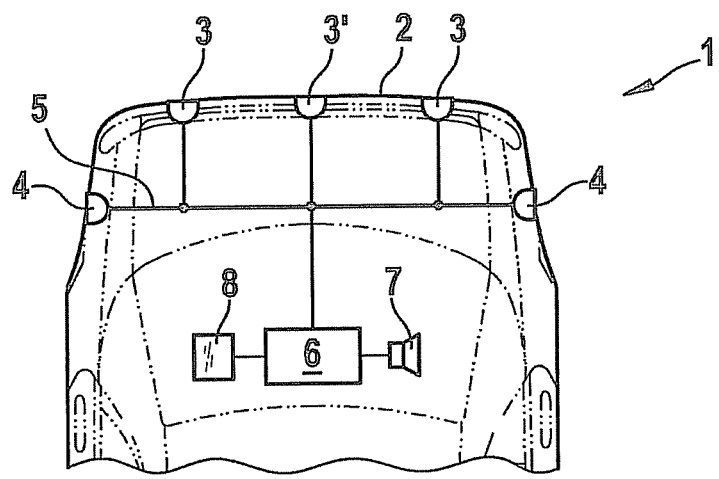
FIG. 1 shows a schematic view of a distance measuring device according to the present invention on a rear end of a vehicle.

A rear end of a vehicle 1 is shown in FIG. 1. Ultrasonic sensors 3, 3' are situated at a rear edge 2 of the vehicle. Similarly, an arrangement at a front side of a vehicle may also be selected. In one preferred specific embodiment, ultrasonic sensors 4 may also be situated at the lateral corners of the vehicle. The ultrasonic sensors are connected to a higher-order control unit 6. This connection may be established, for example, via a point-to-point connection or also via a bus system 5. Higher-order control unit 6 controls the emission of ultrasonic signals with the aid of ultrasonic sensors 3, 3', and 4. In each case the ultrasonic sensors have, for example, a piezoelectric element which as the result of electrical excitation induces a diaphragm to emit ultrasonic waves. The ultrasonic waves are reflected by the surface of an obstruction which is possibly present in the vehicle surroundings, and/or by the roadway surface, and are received again by the ultrasonic sensors. For this purpose, higher-order control unit 6 may switch ultrasonic sensors 3, 3', and/or 4 to a reception mode. In the reception mode, the reflected ultrasonic waves induce the diaphragm of the ultrasonic sensors to oscillate. This oscillation may be converted into electrical signals via the piezoelectric element. These electrical signals are preferably evaluated in evaluation logic systems of ultrasonic sensors 3, 3', and/or 4. However, the evaluation may also take place within higher-order control unit 6. The evaluation is preferably carried out in such a way that an amplitude of the electrical signal is appropriately compared to a threshold value. If the threshold value is exceeded, it is assumed that an ultrasonic signal has been received. The propagation time of the signal is determined based on the point in time that the signal is emitted and the signal is received. By taking the speed of sound into account, the distance of an obstruction from sensors 3, 3', and/or 4, and therefore the distance between the vehicle and an obstruction outside the vehicle, may thus be determined. If this distance is less than a predetermined value, a visual warning is output via a display unit 8, and/or an acoustic warning is output via a speaker 7.

In addition to the described specific embodiment of ultrasonic sensors 3, 3', and 4 as ultrasonic converters which allow switching between transmission and reception mode, and which for this purpose have a transmission path and a reception path, ultrasonic sensors are also usable which have separate transmitting and receiving units.

According to the present invention, the evaluation logic systems of ultrasonic sensors 3, 3' and/or 4 and/or higher-order control unit 6 are also designed to carry out functional testing of ultrasonic sensors 3, 3', and/or 4. Since the functional testing is to be used primarily to recognize impairments of the functionality of ultrasonic sensors 3, 3', and/or 4 due to icing or heavy soiling, for example, it is frequently also referred to as so-called blindness testing of ultrasonic sensors 3, 3', and/or 4.

Figure 2:
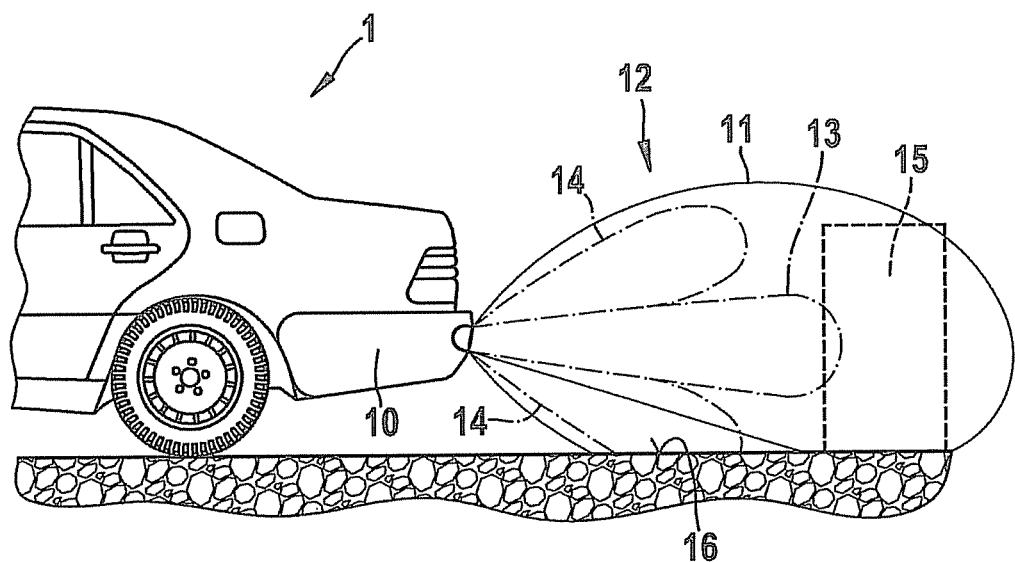
FIG. 2 shows a schematic side view of a vehicle having a distance measuring device according to the present invention.

FIG. 2 shows vehicle 1 in a side view, ultrasonic sensors 3, 3', and 4 being situated on bumper 10 of vehicle 1. As an example, only one of the ultrasonic sensors, namely, ultrasonic sensor 3', is shown in FIG. 2. In its fundamental mode, i.e., at its fundamental frequency, ultrasonic sensor 3' generates a lobe-shaped sound field 11, which is illustrated as a solid line in FIG. 2. In useful mode, i.e., during use of ultrasonic sensor 3' for distance measurement as intended, ultrasonic sensor 3' is acted upon by a control signal having the fundamental frequency, for example 48 kHz for a fourth-generation ultrasonic sensor, with the aid of higher-order control unit 6. Thus, in useful mode, ultrasonic sensor 3' is operated in its fundamental mode.

In addition to this fundamental mode, however, ultrasonic sensors have additional secondary acoustic modes whose frequencies are a function, among other things, of the ultrasonic sensors used and their designs, and which are due to resonance effects, for example. The radiation characteristic of ultrasonic sensor 3' during operation in a secondary mode is illustrated as a dashed-dotted line in FIG. 2. In addition to a primary lobe 13, sound field 12 has secondary lobes 14 which extend in a finger-like manner next to primary lobe 12. In principle, such secondary lobes 14 are also formed during the useful mode of ultrasonic sensor 3' in fundamental mode, but are not illustrated in FIG. 2. In addition, there is generally more than one secondary mode. For the sake of clarity, however, only the sound field of a single secondary mode is illustrated in the figure.

Due to the higher operating frequency of ultrasonic sensor 3' in secondary mode, for example 113 kHz, compared to the fundamental frequency of the fundamental mode, a primary lobe of the sound field results for the secondary mode which is narrower compared to the fundamental mode.

According to the present invention, in useful mode, i.e., for distance measurement, sound waves of the fundamental mode are now used, whereas for functional testing of ultrasonic sensor 3' the sound waves of a secondary mode are used. For this purpose, ultrasonic sensor 3' is preferably controlled with the aid of a control signal which has frequency components of the fundamental mode of ultrasonic sensor 3' as well as frequency components of a selected secondary mode of ultrasonic sensor 3'. The frequency components in each case should be selected to be large enough that ultrasonic sensor 3' emits an ultrasonic signal having the frequency of the fundamental mode as well as an ultrasonic signal having the frequency of the secondary mode. With the aid of a control signal which induces ultrasonic sensor 3' to emit an ultrasonic signal having the frequency of the fundamental mode as well as an ultrasonic signal having the frequency of the secondary mode, it is possible to carry out the functional testing of ultrasonic sensor 3' concurrently with the useful mode of the ultrasonic sensor. Alternatively, for this purpose ultrasonic sensor 3' may also be controlled with the aid of two separate control signals in such a way that the ultrasonic sensor emits either an ultrasonic signal having the frequency of the fundamental mode, or an ultrasonic signal having the frequency of the secondary mode, or, when the two control signals are appropriately superimposed, also emits an ultrasonic signal having frequency components of the fundamental mode and the secondary mode. Independently of the mode, and thus of the frequency, the emitted ultrasonic signals are reflected by the surface of an obstruction 15, which is illustrated as a dashed line in FIG. 2, but are also reflected by a ground surface 16 in the region of vehicle 1, often referred to as "ground reflection." Due to the flat angle of incidence of the ultrasound lobes on ground surface 16, most of the ultrasonic waves which occur are reflected away from vehicle 1. However, as the result of unevennesses in ground surface 16, which are practically always present in conventional road surfaces such as asphalt, for example, a portion of the emitted ultrasonic signals are also reflected back by ground surface 16 to ultrasonic sensor 3' or to an adjacent ultrasonic sensor 3.

According to the present invention, the transmission path of ultrasonic sensor 3' is classified as functional when the reflected signal is received back at the frequency of a secondary mode. The signal may be received in such a way that after emitting the ultrasonic signal, ultrasonic sensor 3' is switched to a reception mode, so that it is once again able to receive the very signal which it has emitted. Alternatively or additionally, in another operating mode additional ultrasonic sensors 3 and/or 4 may be switched to a reception operating mode in order to receive the ultrasonic signal emitted by ultrasonic sensor 3'. If the reflected signal is received again by emitting ultrasonic sensor 3' itself, the reception path of ultrasonic sensor 3' is also classified as functional. For the case that the reflected signal is received by one or more of additional ultrasonic sensors 3 and/or 4, the reception paths of these ultrasonic sensors may be classified as functional.

In one preferred specific embodiment of the present invention, the function of an ultrasonic sensor 3' is tested based on the reflection of the ultrasonic signal of the secondary mode at ground surface 16 in the region around vehicle 1. Since a ground surface 16 is present in practically every operating situation of the vehicle, the testing is thus largely independent of the vehicle location. In the functional testing of ultrasonic sensor 3' with the aid of ground reflections, it is particularly advantageous that sound field 12 of ultrasonic sensor 3' has secondary lobes 14 which are also partially directed toward ground surface 16. In this way, sufficient portions of sound field 12 are pronounced in the direction of ground surface 16, so that reliable functional testing is possible without the need for additional measures such as changing the signal duration and/or amplitude, or increasing the sensitivity of ultrasonic sensor 3'. However, such measures, which are known from published German patent application document DE 10 2005 057 973 A1, for example, may also be used in the method according to the present invention and the device according to the present invention.

Figure 3:
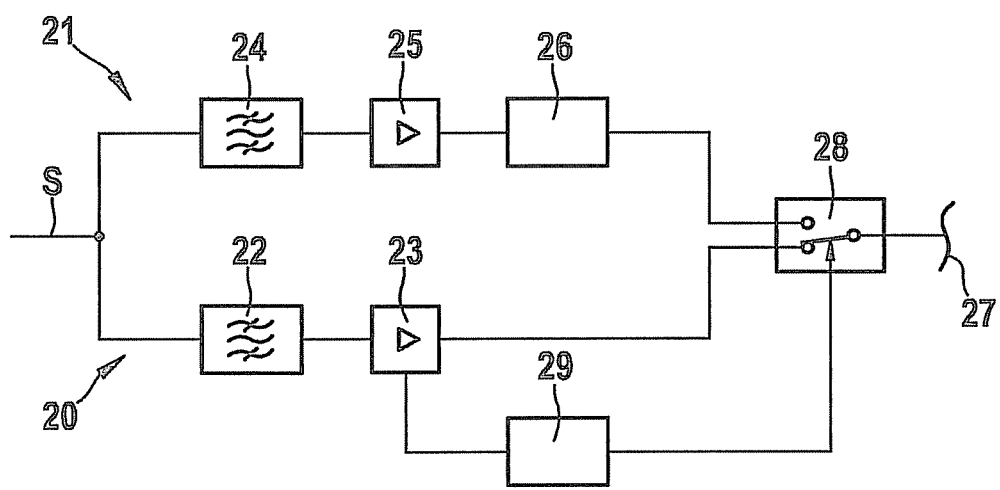
FIG. 3 shows a schematic illustration of the reception path of an ultrasonic sensor of a distance measuring device according to the present invention.

FIG. 3 illustrates one possible embodiment of the reception path of ultrasonic sensor 3'. The reception path of ultrasonic sensor 3' must be designed for input signals having the frequency of the fundamental mode of ultrasonic sensor 3', as well as for input signals having the frequency of the employed secondary mode of ultrasonic sensor 3', i.e., must be able to receive and process same. This may be carried out, for example, in two parallel evaluation branches. In a first reception branch 20, via which the useful mode of ultrasonic sensor 3' is illustrated, a first band pass filter 22 is provided which is used to filter out input signals S having different frequencies than the fundamental frequency of the fundamental mode. A first amplifier unit 23 is connected to first band pass filter 22. In a second reception branch 21, via which the test mode of ultrasonic sensor 3' is illustrated, a second band pass filter 24 is provided which is centered on the frequency of the selected secondary mode, and which thus filters out input signals S having other frequencies. A second amplifier unit 25 is connected to second band pass filter 24. Since the signal amplitudes in second reception branch 21 are smaller, and the signals also are not used for distance measurement, the amplification factor of amplifier unit 25 in second reception branch 21 is independent of distance for the secondary mode, and is typically higher than the amplification factor of amplifier unit 23 in first reception branch 20 for the fundamental mode. An evaluation logic system 26 is also provided in reception branch 21 which compares the received reflected signals, preferably of the ground reflections, to a threshold value, and in the simplest case counts the number of received reflected signals which are above the threshold value, and transmits this number via an interface 27 to higher-order control unit 6 for further evaluation. Alternatively, the further evaluation of the functionality of ultrasonic sensor 3' may take place directly in evaluation logic system 26, for example by comparing the ascertained number of ground reflections to another parameterizable threshold value.

The data of evaluation logic system 26 are advantageously transmitted to higher-order control unit 6 in time periods which are not used for transmitting signals and/or data from the useful mode of ultrasonic sensor 3' in the fundamental mode. For this purpose, a switching unit 28, for example, may be provided which is controlled by a control logic system 29. Control logic system 29 is connected to a unit of first reception branch 20, for example first amplifier unit 23, and controls switching unit 28 in such a way that signals and/or data concerning the functional testing are transmitted to higher-order control unit 6 only when no signals and/or data concerning the distance measurement are to be transmitted.

What is claimed is:

1. A method for functional testing of at least one of a first ultrasonic sensor and a second ultrasonic sensor on a motor vehicle, comprising:
   controlling the operation of the first ultrasonic sensor in such a way that the first ultrasonic sensor emits an ultrasonic signal having a frequency of a secondary mode of the first ultrasonic sensor, wherein the emitted ultrasonic signal is reflected by a surface in a region around the vehicle; and
   classifying one of a transmission path or a transmitting unit of the first ultrasonic sensor as being functional if the reflected ultrasonic signal is received by one of the first ultrasonic sensor or the second ultrasonic sensor on the motor vehicle.

2. The method as recited in claim 1, wherein one of a reception path or a receiving unit of the first ultrasonic sensor is also classified as functional if the reflected ultrasonic signal is received by the first ultrasonic sensor.

3. The method as recited in claim 1, wherein one of a reception path or a receiving unit of the second ultrasonic sensor is classified as being functional if the reflected ultrasonic signal is received by the second ultrasonic sensor.

4. The method as recited in claim 1, wherein the first ultrasonic sensor is controlled in such a way that the emitted ultrasonic signal is reflected at least by a ground surface in the region around the vehicle.

5. The method as recited in claim 1, wherein the first ultrasonic sensor is controlled with the aid of a control signal which has frequency components of the secondary mode of the first ultrasonic sensor and frequency components of a fundamental mode of the first ultrasonic sensor, the frequency components in each case being large enough such that the first ultrasonic sensor emits an ultrasonic signal having the frequency of the secondary mode as well as an ultrasonic signal having the frequency of the fundamental mode.

6. The method as recited in claim 1, wherein the classification is carried out in one of an evaluation logic system of the ultrasonic sensor or in a higher-order control unit.

7. The method as recited in claim 1, wherein the functional testing is carried out at least partially concurrently with a useful mode of the first ultrasonic sensor.

8. The method as recited in claim 7, wherein at least one of signals and data concerning the functional testing are transmitted to a higher-order control unit in time periods in which at least one of signals and data from the useful mode of the ultrasonic sensor are not transmitted.

9. A distance measuring device in a motor vehicle, comprising:
  at least a first ultrasonic sensor; and
  a higher-order control unit configured to trigger (i) an emission of an ultrasonic signal having a frequency of a fundamental mode of the first ultrasonic sensor, and (ii) an emission of an ultrasonic signal having a frequency of a secondary mode of the first ultrasonic sensor;
  wherein the ultrasonic signal having the frequency of the secondary mode is used for functional testing of at least one of the first ultrasonic sensor and a second ultrasonic sensor, wherein the functional testing includes classifying one of a transmission path or a transmitting unit of the first ultrasonic sensor as being functional if the ultrasonic signal having the frequency of a secondary mode and reflected by a surface in a region around the motor vehicle is received by one of the first ultrasonic sensor or the second ultrasonic sensor on the motor vehicle.

10. The distance measuring device as recited in claim 9, wherein one of a reception path or a receiving unit of the first ultrasonic sensor is configured to receive and process ultrasonic signals having a frequency of the fundamental mode of the first ultrasonic sensor and also ultrasonic signals having the frequency of the secondary mode of the first ultrasonic sensor.

11. The distance measuring device as recited in claim 9, further comprising:
  a control logic system configured to enable transmission of results of the functional testing to the higher-order control unit only in time periods in which no data from the useful mode of the first ultrasonic sensor are transmitted.

\* \* \* \* \*